Feb. 28, 1939. H. J. SHAFER 2,148,509
GAS REGULATOR SYSTEM
Filed May 5, 1937 4 Sheets-Sheet 3
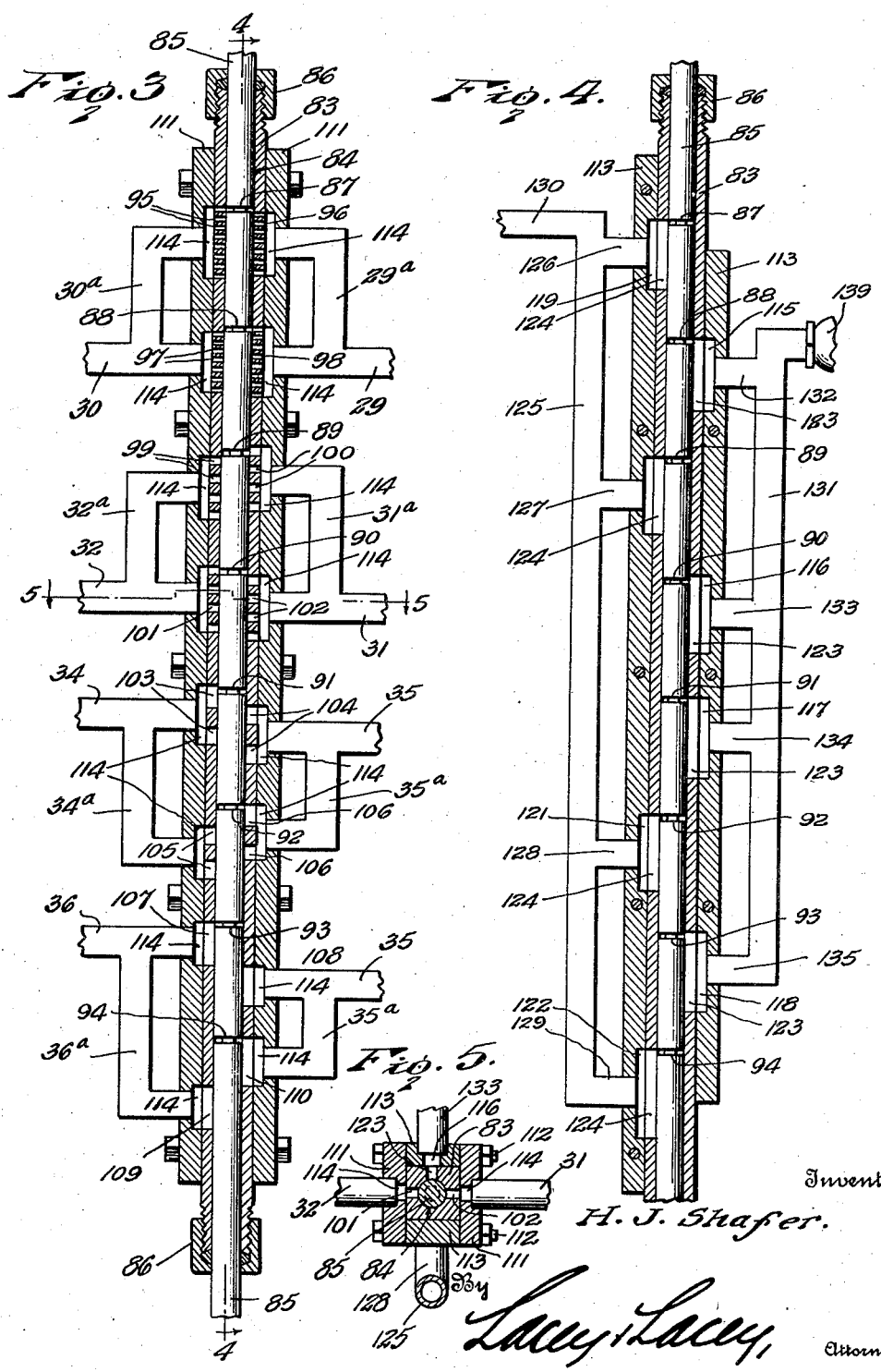

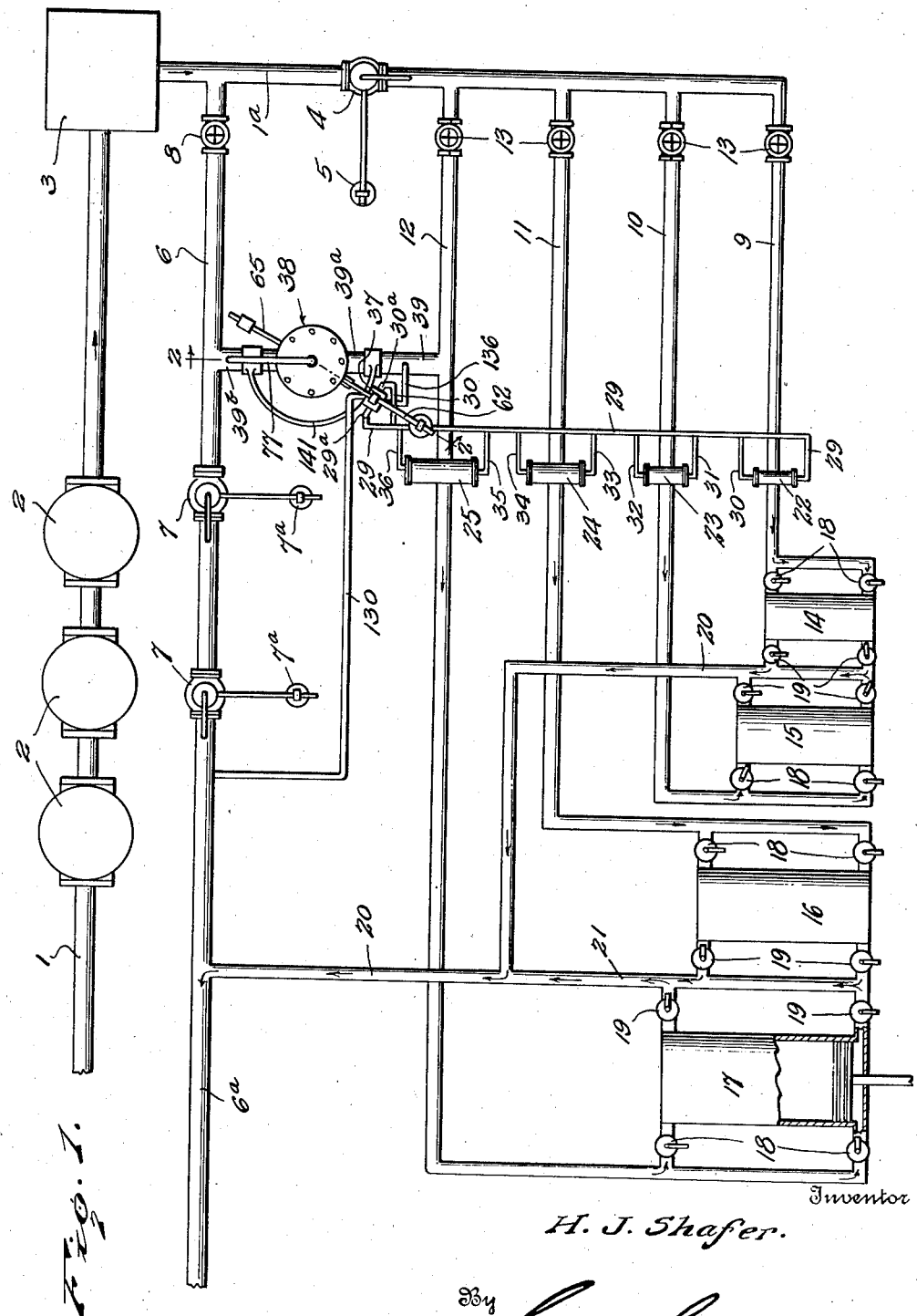

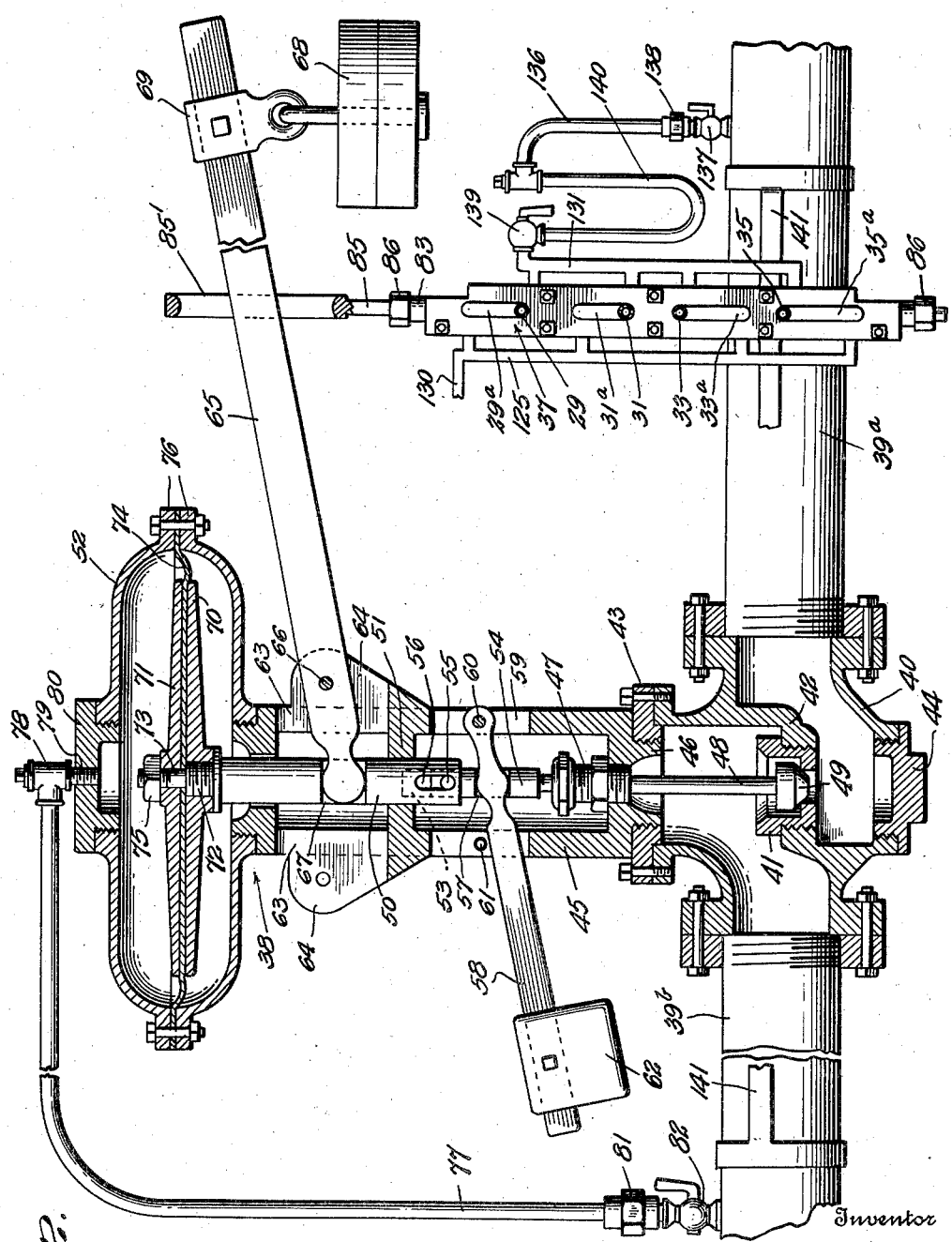

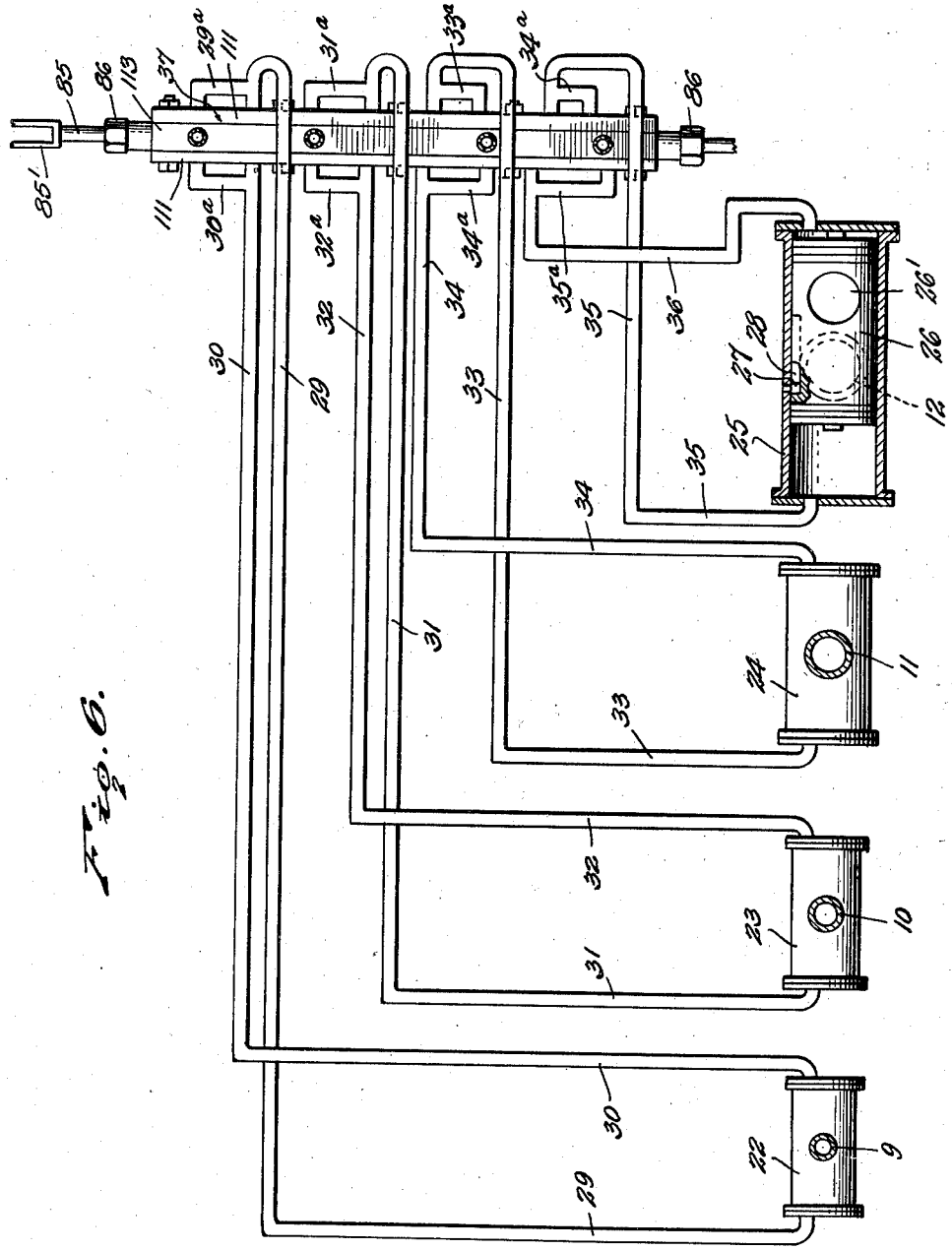

Patented Feb. 28, 1939

2,148,509

UNITED STATES PATENT OFFICE 2,148,509

GAS REGULATOR SYSTEM

Homer J. Shafer, Galion, Ohio

Application May 5, 1937, Serial No. 140,928

6 Claims. (Cl. 50—16)

This invention relates to a gas regulator system and one object of the invention is to provide an apparatus adapted to produce for utilization a portion of the energy which is entirely lost when the present known forms of regulation are employed.

Another object of the invention is to provide a system wherein the volume of gas flowing from a main line through a distributer line to a place of use may be accurately controlled.

Another object of the invention is to provide the system with an improved arrangement of valves and regulators of such construction that, when consumption is increased beyond a predetermined point, a regulator controlling flow of gas from a main line to the distributer line may be moved to an adjusted position and accurately increase the quantity of gas supplied to the distributer line, reduction in gas consumption also causing adjustment of the regulator to proportionately reduce gas supplied to the distributer line.

It is another object of the invention to associate with the regulator an improved valve which is pressure controlled and serves to control movements of the regulator.

The invention is illustrated in the accompanying drawings, wherein

Figure 1 is a diagrammatic view showing the improved gas regulator system installed for use, Figure 2 is a sectional view upon an enlarged scale taken along the line 2—2 of Figure 1 and illustrating the construction of the valve and the associated control device, Figure 3 is a sectional view upon an enlarged scale taken vertically through the control device, Figure 4 is a sectional view taken at right angles to Figure 3 along the line 4—4 of Figure 3, Figure 5 is a sectional view taken transversely through Figure 3 along the line 5—5, and Figure 6 is an enlarged diagrammatic view of a portion of the system.

Referring to Figure 1 of the drawings, the numeral 1 indicates the main line leading from a source of supply and through which gas under high pressure is fed. A plurality of dust collectors 2 have been shown in the main line and also a heater 3, it being understood that the dust collectors and the heater may be of any desired construction and, therefore, has not been illustrated in detail. A check valve 4 of the thermostat type controlled by a weight 5 is mounted in the portion 1ª of the main line 1, and between this check valve and the heater a distributer line 6 leads from the main line. One or more check valves 7 are mounted in the distributer line 6 to control flow of gas through the distributer line, and, while two of these valves have been shown in use, it is to be understood that any number may be used. Each of these check valves is similar in construction to the valve 4 and regulated by a weight 7ª. There has also been provided a gate valve 8 which is normally closed. A series of pipe lines 9, 10, 11 and 12 lead from the portion 1ª of the main line between the valve 4 and the extremity of the portion 1ª of the main line and flow of gas through these pipe lines is controlled by gate valves 13. These pipe lines lead, respectively, to the regulator engines 14, 15, 16 and 17 and each communicates with its companion regulator engine at one side thereof through the medium of the inlet valves 18 which are manually adjustable and disposed at opposite ends of the regulator engine. At its opposite side each regulator engine carries outlet valves 19 which are also manually adjustable, the outlet valves of the regulator engines 14 and 15 being connected with a pipe line 20 leading to and connected with the distributer line 6 between the check valves 7 and the place of use. The outlet valves of the regulator engines 16 and 17 have been shown connected with a branch line 21 connected with the pipe line 20 but it is to be understood that the pipe line 21 may be entirely separate from the pipe line 20. When gas is flowing through the branch lines 9, 10, 11 and 12, the regulator engines will be set in operation and pressure of the gas modified to such an extent that the pressure of the gas passing through the portion 6ª of the distributer line will be at the desired point. The dimensions of the engines are such that the engine 15 has substantially twice the capacity of the engine 14, the engine 16 has substantially twice the capacity of the engine 15 and the engine 17 has substantially twice the capacity of the engine 16. The pressure remains constant but the volume of gas fed to the distributer varies according to which of the engines are in operation.

Flow of gas through the branch lines 9, 10, 11 and 12 is to be automatically controlled, and in order to do so, there have been provided valves 22, 23, 24 and 25 which are mounted in the respective branch lines and progressively increase in dimension, as clearly shown in Figures 1 and 6. Each of these valves has a cylindrical casing in which a valve member 26 is slidably mounted, and upon referring to Figure 6 where the valve 25 has been shown in section, it will be seen that each of the valve members 26 is in the form of a piston slidable longitudinally in the casing and held against turning motion by a pin 27 engaged in a groove formed longitudinally of the valve. When the valve member is in the position shown in Figure 6, flow of gas through the pipe line in which the valve is mounted will be shut off, but, when the valve member moves towards the left in Figure 6, it will be moved out of blocking relation to the branch line in which the valve is mounted and the transverse port 26' of the valve member moved into registry therewith so that gas will be permitted to flow through the branch lines to the engines to set the engines in motion. While engines of the piston type have been shown in use, it is to be understood that turbines or any other type of engine may be used. Movement is imparted to a valve member or piston by admitting gas under pressure into one end of a cylinder and releasing gas from the other end of the cylinder. Flow of gas into and out of the cylinders is effected through pipes 29, 30, 31, 32, 33, 34, 35 and 36, the pipes 29 and 30 being connected with ends of the valve 22 and pipes 31 and 32 being connected with the valve 23 while the pipes 33 and 34 are connected with the valve 24 and pipes 35 and 36 connected with the valve 25.

In order to control flow of gas through the pipes communicating with ends of the cylindrical valves 22, 23, 24 and 25, there has been provided a controlling device 37 mounted, as shown in Figures 1 and 2, and actuated by a pressure control valve, indicated in general by the numeral 38. The pressure control valve 37 is mounted in a branch pipe 39 extending between the distributer line 6 and the pipe line 12, and upon referring to Figure 2, it will be seen that the body 40 of the valve is detachably coupled to the sections 39ᵃ and 39ᵇ of the pipe 39. A valve seat 41 is mounted through the web or partition 42 of the valve body and upper and lower ends of the valve body are closed by a cap 43 and a plug 44, respectively. A hollow column 45 has its lower end formed with a threaded neck 46 which is screwed into an opening formed in the cap 43 and at the upper or inner end of the neck 46 there is mounted a stuffing box 47 through which extends the valve stem 48. This valve stem extends vertically in the valve body and at its lower end is formed with a valve head 49 moved into and out of engagement with the valve seat by vertical movement of the valve stem. A plunger 50 is mounted for longitudinal sliding movement in the upper portion of the column 45 and has its lower portion passing through an opening formed in the partition 51 of the column and its upper portion extending into a diaphragm housing 52 screwed upon the upper end of the column. A socket 53 is formed in the lower end of the plunger to receive the upper end portion of the head 54 of the stem 48, and in order to limit sliding movement of the plunger and the valve stem relative to each other, there has been provided a pin 55 carried by the head 54 and engaged in side slots 56 formed in the lower portion of the plunger in opposed relation to each other at opposite sides of the socket. A recess 57 is formed in the head 54 substantially midway the length thereof, and in this recess engages a portion of a lever 58 which is pivotally mounted in a slot 59 at one side of the column by a pivot pin 60 and extends diametrically through the column and outwardly therefrom through a slot 61 formed at the opposite side of the column. A weight 62 which is adjustably mounted upon the lever controls vertical movement thereof and yieldably resists upward movement of the valve stem. By properly adjusting this weight, the valve head 49 will be yieldably held upon the valve seat and the pressure at which gas passing through the branch pipe 39 may open the valve regulated. Above the partition 51 the column is formed at opposite sides with slots 63 and at opposite sides of each slot are formed ears or bearing brackets 64. A lever 65, which may be referred to as an upper lever and is of greater length than the lower lever 58, is pivotally mounted between one pair of ears 64 by a pin 66 and the inner end of this lever is engaged in a recess 67 formed in the plunger 50. A weight 68 is suspended from a support 69 mounted upon the lever 65 for adjustment longitudinally thereof and urges the plunger 50 upwardly. In view of the fact that one plunger is slidably connected with the head of the valve stem, it may have restricted sliding movement independent of the valve stem. Plates 70 and 71 are mounted upon the reduced and threaded end portions 72 and 73 of the plungers and between these plates is disposed a diaphragm 74 which is firmly gripped when the securing nut 75 is tightened. The plate 70 is screwed upon the threaded portion 72 of the plunger but the upper plate 71 is merely dropped into place about the reduced end portion 73 of the plunger and secured in gripping engagement with the diaphragm when the nut is applied and tightened. The diaphragm projects from margins of the two plates and has its marginal portion secured between marginal flanges 76 of the upper and lower sections of the diaphragm housing in the usual manner, and from an inspection of Figure 2, it will be readily seen that, while the lever 65 urges the plunger 50 upwardly, this plunger may be forced downwardly by the pressure of gas entering the upper portion of the diaphragm housing through a pipe 77. This pipe has one end connected with the coupling 78 which is threaded upon the nipple 79 screwed into the cap 80 of the diaphragm housing and the lower end of the pipe is engaged by a union 81 which connects the same with a valve 82 provided so that flow of gas from the branch pipe 37 into the pipe 77 may be controlled. By so constructing the valve 38, it may be held closed by gas under a predetermined pressure in the section 39ᵇ of the branch pipe 39 but when this pressure is reduced by initial use of the gas the weighted lever 65 may open the valve and allow gas to flow through the pipe 39. A portion of this gas enters the pipe 77 and flows through the same into the upper portion of the diaphragm housing to act upon the diaphragm and urge the plunger 50 downwardly but the pressure will not be sufficient to close the valve until use of the gas ceases. The plunger may have movement independent of the valve stem due to the sliding connection between the plunger and the head 54 of the valve stem. Therefore, the lever 65 may actuate the control device 35 without changing the position of the valve head 49.

The device 37 which controls opening and closing of the valves 22, 23, 24 and 25 and consequent operation of the motors is constructed as shown in Figures 3, 4 and 5. The body of the control device consists of a metal bar 83 formed with a longitudinally extending bore 84 to slidably receive a rod or plunger 85 and stuffing boxes 86 are provided at upper and lower ends of the body to form tight joints about the rod or plunger and prevent leakage. A slotted head 85' extends upwardly from the plunger and the lever 65 extends through this head so that the plungers may be adjusted through the medium of the lever. Circumferentially extending grooves 87, 88, 89, 90, 91, 92, 93 and 94 are formed in the plunger in spaced relation to each other longitudinally thereof. Adjacent its upper end, the body is formed with groups of side ports 95 and 96 communicating with the bore 84 at opposite sides thereof and by sliding the bar or plunger longitudinally the groove 87 may be moved into registry with predetermined ones of the ports. Similar side ports 97 and 98 are formed through opposite side portions of the body in position for the groove 88 to register therewith during sliding adjustment of the plunger, and the groups of side ports 95, 96, 97 and 98 constitute a set of cooperating ports. A second set of ports consisting of the groups 99, 100, 101 and 102 formed in the bar has been provided to cooperate with the grooves 89 and 90. Other sets of side ports have been provided, one consisting of the groups of side ports 103, 104, 105 and 106 cooperating with the grooves 91 and 92, and the other consisting of the ports 107, 108, 109 and 110 cooperating with the grooves 93 and 94. The ports of the sets decrease in number and increase in size toward the lower end of the body or bar 83 in order that gas under pressure in larger quantities may flow through these ports and the companion valves to the engines as the engines are set in motion. This will be hereinafter fully set forth.

Side plates 111 are secured against opposite side faces of the bar or body 83 by bolts 112, and from an inspection of Figure 5, it will be seen that the side plates 111 project from opposite sides of the body in order that the bolts may also serve as securing means for side plates 113. Sealing gaskets may be provided between confronting faces of the body and side plates to provide tight joints. The side plates 111 are formed with openings to receive the pipes 29 through 36 and additional openings are provided to receive branches of these pipes which have been identified by adding the letter "a" to the corresponding numerals. Inner faces of the side plates 111 are formed with longitudinally extending grooves 114 which are spaced from each other longitudinally of the side plates, and upon referring to Figure 3, it will be seen that the grooves 114 establish communication of the pipes 29 through 36 and their branches with the cooperating groups of side ports 95 through 110 respectively.

Grooves 115, 116, 117 and 118 are formed in the inner face of one of the side plates 113 and similar grooves 119, 120, 121 and 122 are formed in the inner face of the other side plate 113. These grooves register with grooves 123 and 124 formed in opposite side portions of the bar or body 85 and establish individual communication between the grooves of the side plates 113 and cooperating ones of the grooves 87 through 94 respectively. A manifold 125 extends vertically at one side of the control device and is provided with nipples 126, 127, 128 and 129 secured through openings formed in the adjacent side plate 113 and communicating with the grooves or pockets 119, 120, 121 and 122, respectively. By this arrangement gas may flow from the grooves 87, 89, 92, and 94 of the plunger into the manifold and through the pipe 130 which communicates with the portion 6a of the distributer line 6 between the pipe 20 and the valves 7. At the other side of the control device is another manifold 131 having nipples 132, 133, 134 and 135 secured through openings formed in the adjacent side plate 113 and communicating with the grooves or pockets 115, 116, 117 and 118, respectively, so that gas may flow from the manifold 131 into the grooves 88, 90, 91 and 93 of the plunger. A pipe line 136 has one end connected with the section 39a of the branch pipe 39 by a valve 137 and union 138 and its other end connected with the manifold 131 by a valve 139. A U-shaped oil trap 140 is interposed in the pipe line 136 so that oil will be taken up by gas flowing through the pipe line 136 and into the control device to lubricate the plunger and allow the plunger to slide easily. The control device is mounted in a vertical position by a bracket 141 carried by the sections of the branch pipe 139 and may be adjusted along the bracket for location in a convenient position.

When this apparatus is in use, the valve 8 is closed and the valves 13 opened. The valve 49 is closed by the lever 58 and when no gas is being used pressure of the gas in the upper portion of the housing 52 acts upon the diaphragm to maintain the lever 65 in the position shown in Figure 2. Initial use of gas causes a momentary reduction in pressure above the diaphragm and the weight 68 swings the lever 65 downwardly to lift the plunger 50 and the valve stem 48 and raise the valve head 49 off the valve seat. Additional use of gas results in further downward movement of the lever 65 and as it makes contact with the head 85' at the lower end of the slot formed therein the plunger 85 will be depressed to move the groove 88 into registry with the upper side port of the group 97 and the groove 87 into registry with the upper port of the group 96. Gas may then flow from the pipe line 136 and the manifold 131 through the groove 88 into the pipe 30 through which it passes into one end of the casing of valve 22 to move the piston thereof to the opened position and the engine 14 will be set in motion to deliver the necessary quantity of gas through the pipe 20 and into the low pressure portion 6a of the distributer line. During movement of the piston of valve 22 in an opening direction gas in the other end of the cylindrical valve casing is forced through the pipe 29 and this gas flows through the branch 29a and through the upper port of the group 96 into the groove 87 from which it flows through the manifold 125 and through the pipe 130 to the low pressure portion 6a of the distributer line. As additional gas is used, the plunger 85 is further depressed and the grooves 87 and 88 will be moved into registry with the next to the top ports of the groups 95 and 98 so that the gas now flows from the groove 88 into the pipe 29 and through this pipe into the casing of the valve 22 to move its piston to the closed position. During the closing movement gas is forced from the other end of the valve casing and through the pipe 30 and its branch 30a to the groove 87 through which it passes and through the manifold 125 and the pipe 130 to the distributer line. The engine 14 will thus be shut off but since registration of the grooves 89 and 90 with upper ports of the groups 99 and 102 causes flow of gas in a direction to move the piston of the valve 23 to an opened position, the engine 15 will be set in motion and a larger quantity of gas fed through the pipe 20 to the distributer line. Each time use of gas increases to a predetermined extent, the plunger 85 will be shifted downwardly to make a change in the operation of the engines and increase flow of gas to the distributor line but the pressure in the portion 6ª of the distributer line remains the same.

By using four engines of progressively increased capacity and the arrangement of ports shown in Figures 3 and 4, fifteen changes in the quantity of gas fed to the distributer line are permitted which are as follows: The first downward movement of the plunger sets engine 14 in motion and the second downward movement of the plunger shuts off engine 14 and starts engine 15. A third downward movement of the plunger causes both engines 14 and 15 to operate. It is not necessary to trace the flow of gas to adjust the valves as it can be easily followed by an inspection of Figures 2 and 3. The fourth movement of the plunger shuts off engines 14 and 15 and starts engine 16 which is twice as large as engine 15 and the fifth downward movement of the plunger shuts off engine 15 while engines 16 and 14 operate. The sixth movement of the plunger shuts off engine 14 and causes engines 16 and 15 to operate and when the seventh movement of the plunger takes place engines 16, 15 and 14 all operate. The eighth downward movement of the plunger causes engines 16, 15 and 14 to be shut off and engine 17 which has twice the capacity of engine 16 is set in motion and when the ninth downward movement of the plunger takes place engines 16 and 15 remain shut off but engine 14 is set in motion and operates with the engine 17. The tenth movement of the plunger causes engines 17 and 15 to operate while engines 16 and 14 are shut off and the eleventh movement of the plunger causes engines 17, 15 and 14 to operate while engine 16 remains shut off. Movement number twelve of the plunger causes engines 17 and 16 to operate and engines 15 and 14 to be shut off and the thirteenth movement of the plunger sets engines 17, 16 and 14 in motion and shuts off engine 15. When the fourteenth downward movement of the plunger takes place, engine 14 will be shut off and engines 17, 16 and 15 operate and, when the fifteenth downward movement of the plunger takes place, all of the engines operate and the peak volume of gas will be obtained. From this point on gas is fed through the valve 49 and since the grooves of the plunger are not contacted by ports, the cylindrical valves remain in an opened position.

It will thus be seen that fifteen different variations in flow of gas to the distributer line may be obtained and the control automatically adjusted so that the correct quantity will be fed from the gas main to the distributer line according to whether consumption is low or at its peak. By varying the number of engines and making appropriate changes in the number and arrangement of ports and grooves of the control device either a larger or smaller number of variations in the quantity of gas fed to the distributer line may be obtained. It should be noted, however, that although the quantity of gas will be increased or decreased as the plunger is shifted upwardly or downwardly the pressure remains the same.

The apparatus is very efficient in operation and when installed gas passing from the main line to a distributer line may be reduced from a very high pressure in the main line to a predetermined pressure in the distribter line, the pressure in the distributer line being maintained at the predetermined pressure but the quantity being increased or decreased as needed by automatic adjustment of the control device which regulates operation of the engines as needed.

Having thus described the invention, what is claimed as new is:

1. In a gas flow controlling system, a main line, a distributor line leading from said main line, branch lines leading from said main line, regulator engines having inlets coupled to said branch lines and having discharge pipes leading to said distributer line, means for admitting gas under predetermined pressure from the main line into the branch lines, valves for controlling flow of gas through the branch lines to said engines, a bridging pipe between said distributer line and one branch pipe, a pressure actuated valve for controlling flow of gas through said bridging pipe, and a regulator for controlling opening and closing of the valves for the branch pipes actuated by said pressure actuated valve.

2. In a gas flow controlling system, a main line, a distributer line leading from said main line, branch lines leading from said main line, regulator engines having inlets coupled to said branch lines and having discharge pipes leading to said distributer line, means for admitting gas under predetermined pressure from the main line into the branch lines, pressure actuated valves for controlling flow of gas through said branch lines, a bridging pipe between said distributer line and one branch line, a valve for controlling flow of gas through said bridging pipe, pressure actuated means for adjusting the last-mentioned valve, means for conducting gas under pressure from the bridging pipe to the pressure actuated means, and means actuated from said pressure actuated means for controlling flow of gas under pressure to the pressure actuated valves for said branch lines.

3. In a gas flow controlling system, a main line, a distributer line leading from said main line, branch lines leading from said main line, a valve for reducing pressure in the distributer line, regulator engines having inlets coupled to said branch lines and having discharge pipes leading to said distributer line beyond the pressure reducing valve thereof, means for admitting gas under predetermined pressure from the main line into the branch lines, pressure actuated valves for controlling flow of gas through said branch lines, and pressure actuated means for controlling flow of gas to the pressure actuated valves of the branch lines and setting predetermined ones of the engines in motion to control the quantity of gas passing from the branch lines to the distributer line.

4. In a gas flow controlling system, a main line, a distributer line leading therefrom, branch lines leading from said main line, regulator engines receiving gas from said branch lines and delivering the gas in controlled quantities to said distributer line, pressure actuated valves for said branch lines, pipes for conducting gas under pressure to said valves to open and close the valves and set predetermined ones of the engines in operation and deliver predetermined quantities of gas to said distributer line, and pressure responsive means for controlling flow of gas through said pipes to said valves.

5. In a gas flow controlling system, a main line, a distributer line leading therefrom, branch lines leading from said main line, regulator engines receiving gas from said branch lines and delivering the gas in controlled quantities to said distributer line, pressure actuated valves for said branch lines, tubes for conducting gas under pressure to said valves to open and close the valves and effect operation of predetermined ones of said engines, a valve yieldably held closed and adapted to be opened by gas under predetermined pressure, pressure actuated operating means associated with said valve, and means for selectively controlling flow of gas through said tubes to open and close said valves operatively connected with said actuating means for adjustment thereby.

6. In a gas flow controlling system, a main line, a distributer line leading therefrom, branch lines leading from said main line, regulator engines receiving gas from said branch lines and delivering the gas at controlled pressure to said distributer line, pressure actuated valves for said branch lines, tubes for conducting gas under pressure to said valves to open and close the valves and effect operation of predetermined ones of the engines for delivering the gas to said distributer line in predetermined quantities, a valve yieldably held closed and adapted to be opened by gas under predetermined pressure, pressure actuated operating means associated with said valve, a lever associated with and moved by said pressure actuated operating means, and a regulator for controlling flow of gas through said tubes to open and close the valves of the branch lines including a casing having said tubes connected therewith, and a plunger slidable in said casing and having an end portion projecting from the casing and operatively associated with said lever for adjustment thereby.

HOMER J. SHAFER.